Dec. 7, 1965 L. W. THROSSEL Re. 25,936

DISPOSABLE SEATING STRUCTURE FOR INFANTS

Original Filed Oct. 20, 1958

INVENTOR.
LEW W. THROSSEL
BY
Merchant & Merchant
ATTORNEYS

United States Patent Office

Re. 25,936
Reissued Dec. 7, 1965

25,936
DISPOSABLE SEATING STRUCTURE FOR INFANTS

Lew W. Throssel, Eldora, Iowa, assignor, by direct and mesne assignments, to Infanseat Company, Eldora, Iowa, a corporation of Iowa Original No. 2,960,149, dated Nov. 15, 1960, Ser. No. 768,116, Oct. 20, 1958. Application for reissue Nov. 27, 1964, Ser. No. 429,692
1 Claim. (Cl. 297—443)

Matter enclosed in heavy brackets [ ] appears in the original patent but forms no part of this reissue specification; matter printed in italics indicates the additions made by reissue.

My invention relates generally to *foldable and disposable chairback supported seating structure for babies, e.g.* [infant seats] *stands* of the type disclosed in Patent 2,324,421, and more particularly to relatively inexpensive disposable devices of this character.

The primary object of my invention is the provision of an infant [seat] *stand* of the type immediately above described which may be formed from a blank of relatively tough paper stock such as corrugated paper board.

A further object of my invention is the provision of a device of the class immediately above described which is extremely inexpensive to produce and which is sufficiently rugged and durable in construction to endure the stresses and strains of normal use for the relatively brief period of time for which it was constructed.

A further object of my invention is the provision of a device of the class immediately above described which, while inexpensive to produce, may be utilized with all the benefits derivable from a more expensive and permanent structure of this type.

A further object of my invention is the provision of a device of the class above described which is extremely light in weight and hence extremely easy to handle, store and ship.

The above and still further objects of my invention will become apparent from the following detailed specification, appended claim and attached drawings.

Referring to the drawings wherein like characters indicate like parts throughout the several views.

Figure 1:
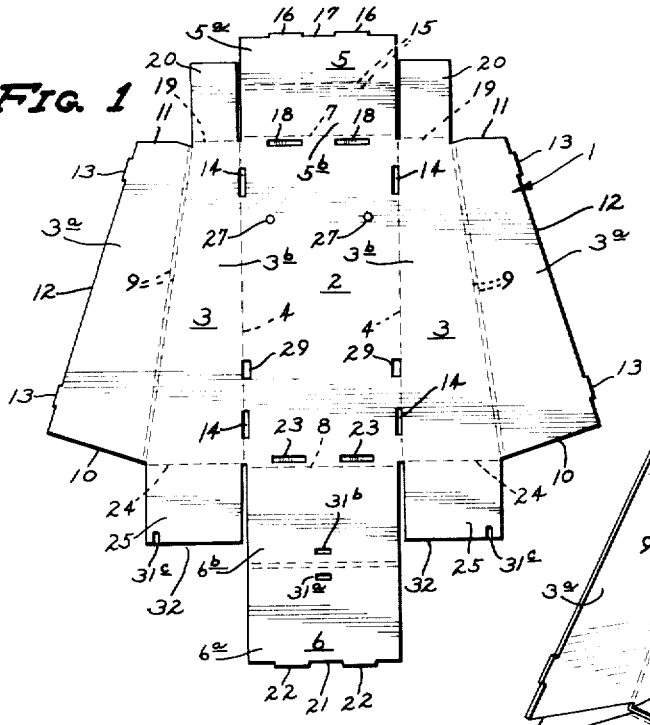
FIG. 1 is a view in top plan of a blank of corrugated board or the like scored and folded in accordance with my invention.
Figure 2:
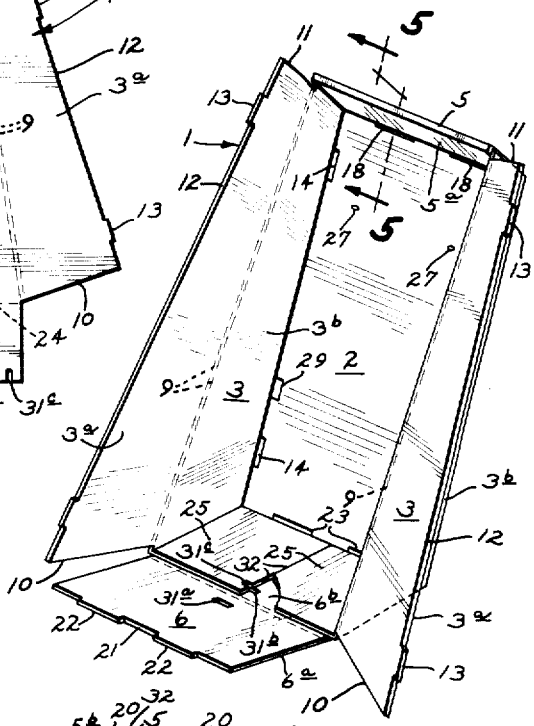
FIG. 2 is a view in perspective showing partial formation of my novel structure from the blank of FIG. 1.

Referring with greater particularity to the drawings, the numeral 1 indicates in its entirety a blank stamped from corrugated paper board stock and folded and scored to provide a back element 2, side wall members 3 secured to opposite side edges of the back element 2 along fold lines 4, and top and bottom wall members 5 and 6 secured respectively to the upper and lower edges of the back element 2 along fold lines 7 and 8 respectively.

Figure 3:
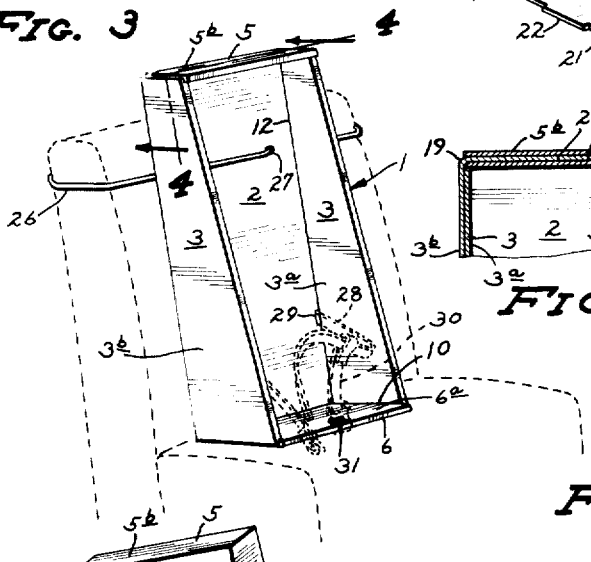
FIG. 3 is a perspective view on a somewhat reduced scale showing my novel structure in complete and operative condition.
Figure 4:
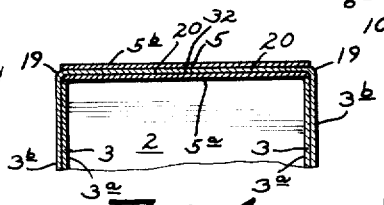
FIG. 4 is an enlarged fragmentary sectional view taken on the line 4—4 of FIG. 3.
Figure 5:
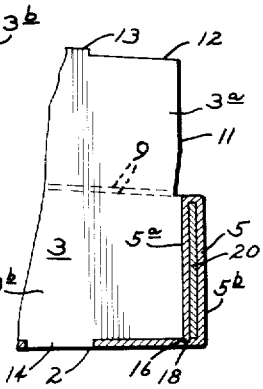
FIG. 5 is an enlarged fragmentary view taken on the line 5—5 of FIG. 2.
Figure 6:
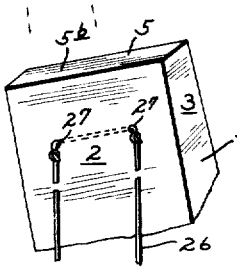
FIG. 6 is a fragmentary view in rear elevation of the structure of FIG. 3.

Side wall members 3 are shown as comprising matching inner and outer sections 3a, 3b which are connected together along central fold lines 9. As shown, each of the sections 3a, 3b taper from their relatively wide lower edges 10 to their relatively narrow upper edges 11, whereby to define upwardly tapering side walls, as shown in FIG. 3, when the inner sections 3a are folded inwardly upon the outer sections 3b, along fold line 9, and the side wall members 3 swung at right angles with respect to the back 2 along the fold lines 4. To maintain the side wall members 3 in this operative position, the free outer edges 12 of the inner side wall sections 3a are formed to provide tabs 13 which are insertable into openings or recesses 14 on opposite sides of the back element 2.

The top wall member 5 likewise comprises matching inner and outer wall sections 5a, 5b respectively which are foldable along the line 15. As shown particularly in FIG. 1, the inner section 5a is formed to provide tabs 16 along its free outer edge 17 which are adapted to be received within apertures or recesses 18 adjacent the upper edge of the back element 2, as defined by the fold line 7. The adjacent opposite side edges 19 of the outer sections 3b of the side wall members 3 are provided with flaps 20 receivable between the inner and outer wall sections 5a, 5b of the top wall member 5 for the purpose of securely locking the top wall member 5 to the side wall members 3 in their operative positions of FIG. 3 wherein they project at right angles to the plane of the back element 2. Any suitable adhesive may be utilized for securing the elements 5a, 5b and 20 together.

The relatively deep bottom wall forming member 6 likewise comprises inner and outer matching wall sections 6a, 6b, the free outer edge 21 of the inner wall section 6a having tabs 22 receivable in apertures or recesses 23 in the back-forming element 2, when the bottom-forming element 6 is placed in operative position by bending the same at right angles in the plane of the back-forming element 2, along fold line 8. The adjacent opposite side edges 24 of the outer side wall members 3b are likewise formed with flaps 25 which are receivable between and rigidly adhered to the inner and outer wall sections 6a, 6b, to lock these elements together.

To anchor my novel infant [seat] *seating structure* in a generally upright position to a suitable vertical support, as shown in FIG. 3, I provide a tie member 26 which projects through laterally spaced openings 27 in the back element 2. For the purpose of securing an infant within the forwardly opening [seat] *seating structure,* I provide an adjustable girth strap 28, opposite ends of which project through laterally spaced openings 29 in the back element 2 intermediate the upper and lower ends thereof. The extreme outer ends rearwardly of the back element 2 are knotted or otherwise enlarged to discourage their being pulled through the openings 29. The intermediate portion of the girth strap 28 is secured to the upper end of a crotch strap 30, the lower end of which is looped through an opening or aperture 31 in the bottom wall member 6 intermediate the sides thereof. As shown the aperture 31 is formed by alignable apertures 31a, 31b in the inner and outer wall sections 6a, 6b and by alignable notches 31c in the opposed adjacent edges 32 of the flaps 25.

The method of use of my novel disposable infant [seat] *seating structure* above described is identical with that described in Patent 2,324,421, and as there shown any desired arrangement of cushions or pads, disposable or otherwise, may be placed in engagement with the back element 2 and the bottom wall member 6.

My invention has been thoroughly tested and found to be completely satisfactory for the accomplishment of the above objects, and while I have disclosed a preferred embodiment it should be understood that same may be capable of modification without departure from the scope and spirit of the appended claim.

What I claim is:

A foldable and disposable chairback supported [seat] *seating* structure for infants, comprising a one-piece foldable blank having a substantially rectangular back wall portion adapted to be mounted on and rest against said chairback, sidewall portions substantially coextensive with and foldably connected to opposite sides of said back wall portion, each said side wall portion being obliquely folded upon itself substantially midway between its longitudinal outer edge and its foldable connection with said back portion and extending normal thereto to provide a reenforced [seat] *bottom* suspending means, foldable end wall portions extending normal to and beyond one end of each of said side and back wall portions with said side end wall portions disposed in superimposed relation to said back end portion and providing a reenforced [seat] *bottom* suspended between said folded side portions, and means interconnecting said folded side and superimposed end wall portions to said back wall portion and said back wall portion to a chairback.

References Cited by the Examiner

The following references, cited by the Examiner, are of record in the patented file of this patent or the original patent.

UNITED STATES PATENTS

| | | | |
|---|---|---|---|
| 2,324,421 | 7/1943 | Ouellette | 155—154 |
| 2,544,101 | 3/1951 | Oxley | 229—34 X |
| 2,707,587 | 5/1955 | Wittstein | 229—34 |
| 2,759,527 | 8/1956 | Myrick | 155—33 |
| 2,809,775 | 10/1957 | White | 229—34 |

FRANK B. SHERRY, *Primary Examiner.*

C. A. NUNBERG, *Assistant Examiner.*